US006538401B2

(12) United States Patent
Rew et al.

(10) Patent No.: US 6,538,401 B2
(45) Date of Patent: Mar. 25, 2003

(54) ADAPTIVE SHUNT SYSTEM FOR VIBRATION CONTROL OF STRUCTURES AND OPERATING METHOD OF THE SAME

(75) Inventors: Keun Ho Rew, Taejon (KR); In Lee, Taejon (KR); Won Ho Shin, Kyungsangnam-do (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 10/054,645

(22) Filed: Jan. 22, 2002

(65) Prior Publication Data

US 2003/0012042 A1 Jan. 16, 2003

(30) Foreign Application Priority Data

Jul. 4, 2001 (KR) .......................................... 2001-39870

(51) Int. Cl.[7] .............................................. H02K 33/00
(52) U.S. Cl. ...................................................... 318/114
(58) Field of Search ................................. 318/114, 560, 318/561; 363/164, 165

(56) References Cited

U.S. PATENT DOCUMENTS 5,495,152 A * 2/1996 Fukui .......................... 318/116
5,777,445 A * 7/1998 Motegi ........................ 318/114

* cited by examiner

*Primary Examiner*—Matthew Nguyen
(74) *Attorney, Agent, or Firm*—Allen, Dyer, Doppelt, Milbrath & Gilchrist, P.A.

(57) ABSTRACT

An adaptive shunt system for controlling vibrations of a frequency-varying structure, the system comprising: a detector for detecting vibrations generated from a predetermined structure and generating vibration signals corresponding to the vibrations; a computer for inputting the vibrations signals from the detector; a signal processing unit for processing the vibration signals from the computer and generating a voltage command in real-time; and an adaptive shunt device for adaptively controlling the vibrations of the structure of which natural frequency varies at every moment according to the voltage command.

15 Claims, 12 Drawing Sheets

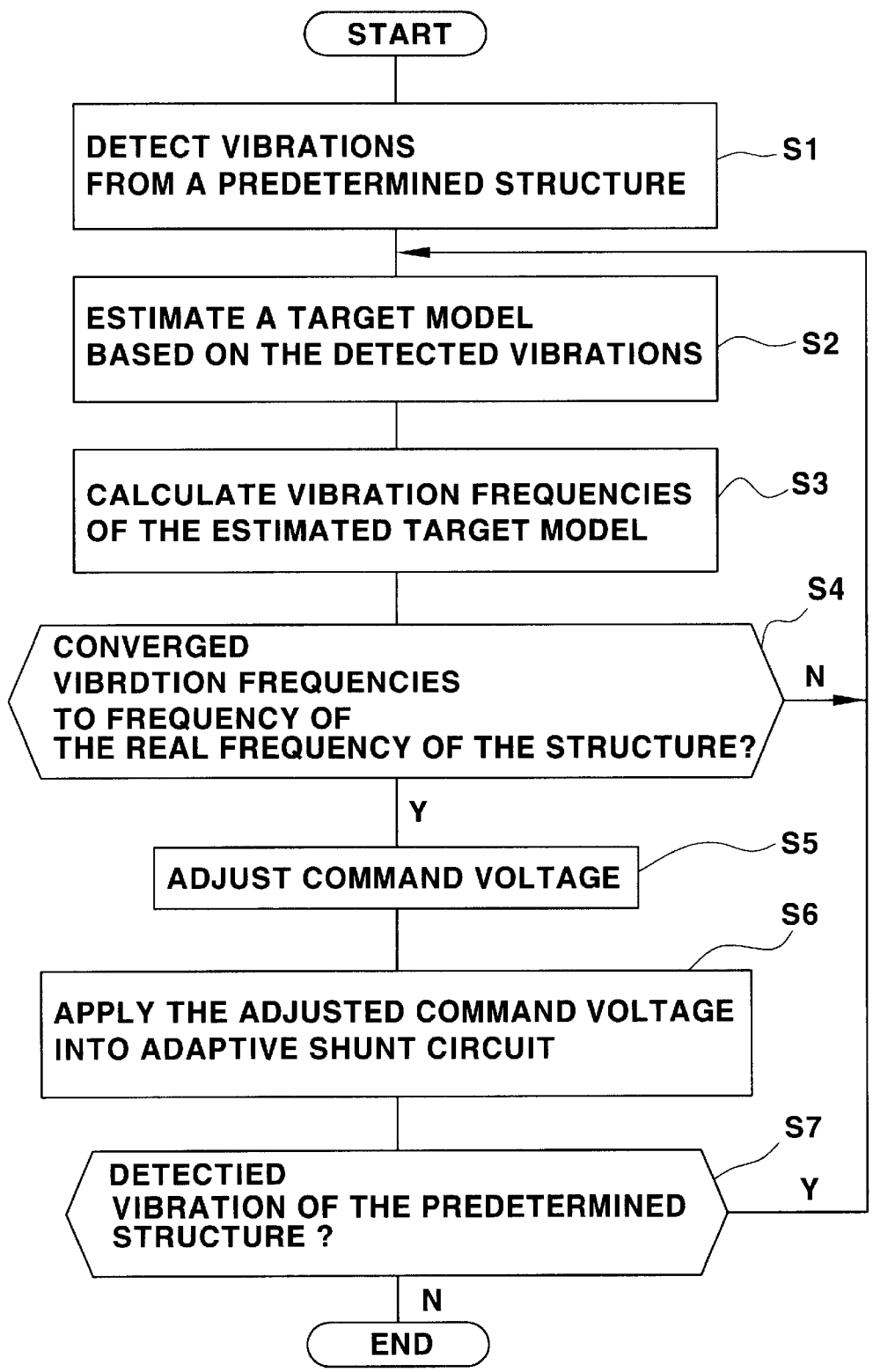

ADAPTIVE SHUNT SYSTEM FOR VIBRATION CONTROL OF STRUCTURES AND OPERATING METHOD OF THE SAME

FIELD OF THE INVENTION

The present invention relates to an adaptive shunt system for controlling the structural, vibrations, and more specifically, to an adaptive shunt system for adaptively controlling the structural vibrations from frequency-varying structures as a command voltage calculated in real time by estimated natural frequency of the frequency-varying structures is fed thereto, and method therefor

BACKGROUND OF THE INVENTION

Generally, the shunt system is for controlling the vibrations of the frequency-varying structures. Namely, the shunt system suppresses a vibration occurred in the systems, such as the space structures, sports articles (including snow boards and tennis rackets), and ultra-high precision machines (including the precision optical instruments and the semiconductor manufacturing equipment).

FIG. 1 is a circuit diagram showing the conventional passive shunt circuit.

As shown in FIG. 1, the conventional passive shunt circuit comprises an inductance unit 200 including two operation-amplifiers 220A and 220B, a power supply 400, and a mechanical-to-electrical conversion unit 100.

The mechanical-to-electrical conversion unit 100 performs as a capacitor 120 for converting the vibration energy of a structure to electrical energies. Therefore, the conventional passive shunt circuit forms a L-R-C circuit as inductance unit 200, the capacitor 120 of the mechanical-to-electrical conversion unit 100 and a variable resistor R0 between the mechanical-to-electrical conversion unit 100 and the inductance unit 200 are serially connected.

This conventional passive shunt circuit has been used to control the vibrations of structures, but in this circuit, as the vibration frequencies of the structure are varied, so its performance is drastically degraded.

FIG. 2 illustrates the graphs showing the frequency response results of the uncontrolled cases and the results of the controlled cases using the conventional passive circuit of FIG. 1. As shown in the graphs, as the vibration frequency is diminished from F0 to F1 and F2, the vibration control performance is drastically degraded.

Other conventional methods for controlling the vibrations of structures will be explained below.

First, of the methods, there is a method in which a motor is used to change a resistance of the circuit and to cope with the vibration frequency of the structure. Therefore, the vibration controlling system adopting the motor has disadvantages in that it consumes a lot of power and its size and weight are also increased.

Second, there is another method adopting a PLL circuit. The PLL circuit searches and locks the vibration frequency of a single mode. However, the vibrating controlling system adopting the PLL circuit has disadvantage in that it can not detect the vibration frequency not only at an excessive vibration response, but also in multiple modes.

Third, there is still another method adjusting a amount of oil within a tuned-mass-damper. Namely, the system adjusts the rigidity of structures as a motor varies the natural frequency of a tank. However, the system using the above method can not be easily installed and further its installation expense is high.

Fourth, there is further method adopting a piezoelectric device. For example, a gyroscope using the piezoelectric device precisely measure the outer angular velocity. However, because it consists of a complicated circuit and adopts an algorithm for controlling it, the configuration cost of the system is high. Therefore, the system is applicable only to the expensive system.

FIG. 3A illustrates graphs showing frequency responses when the center frequency of the passive shunt circuit of FIG. 1 shifts. FIG. 3B illustrates graphs showing frequency responses when the electrical damping ratio of the passive shunt of FIG. 1 shifts.

As shown in the drawings, the tuning characteristics of the conventional passive shunt are quite sensitively varied with respect to the variations of the vibration frequencies. Thus, it can be seen that the vibration characteristics are steeply shifted when the electrical center frequencyshifts. Also, the overlapping of the frequency response at the points S1 and T1 are the same as predicted theoretically, which gives an indirect proof that the experiment was accurate to us.

SUMMARY OF THE INVENTION

It is an object of the present invention to provide an adaptive shunt system for adaptively controlling the structural vibrations from the frequency-varying structures as command voltage calculated in realtime by estimated natural frequency of the frequency-varying structures is fed thereto, and method therefor.

It is another object of the present invention to provide an adaptive shunt for controlling the vibrations of a structure, and an operating method for the same, in which the vibration frequencies as estimated in a DSP board on a real time basis are made to have an electrical center frequency suiting to the vibration frequencies of the structure, thereby controlling the vibrations of the structure.

In order to achieve the objects of the present invention, there is provide to an adaptive shunt system for controlling vibrations of a frequency-varying structure, the system comprising: a detector 700 for detecting vibrations generated from a predetermined structure and generating vibration signals corresponding to the vibrations; a computer 600 for inputting the vibrations signals from the detector; a signal processing unit 500 for processing the vibration signals from the computer and generating a voltage command in real-time; and an adaptive shunt device 900 for adaptively controlling the vibrations of the structure of which natural frequency varies at every moment according to the voltage command.

In order to achieve the another objects of the present invention, there is provide to a vibration controlling method of a structure which varies its natural frequency, the method comprising the steps of: detecting vibrations generated from the structure; estimating a target model based on the detected vibrations; calculating vibration frequencies based on the estimated target model; adjusting a command voltage if the vibration frequencies converge to real frequencies of the structure; and controlling the vibrations of the structure according to the command voltage.

BRIEF DESCRIPTION OF THE DRAWINGS

The above objects and other advantages of the present invention will become more apparent by describing in detail the preferred embodiment of the present invention with reference to the attached drawings in which.

Figure 1:
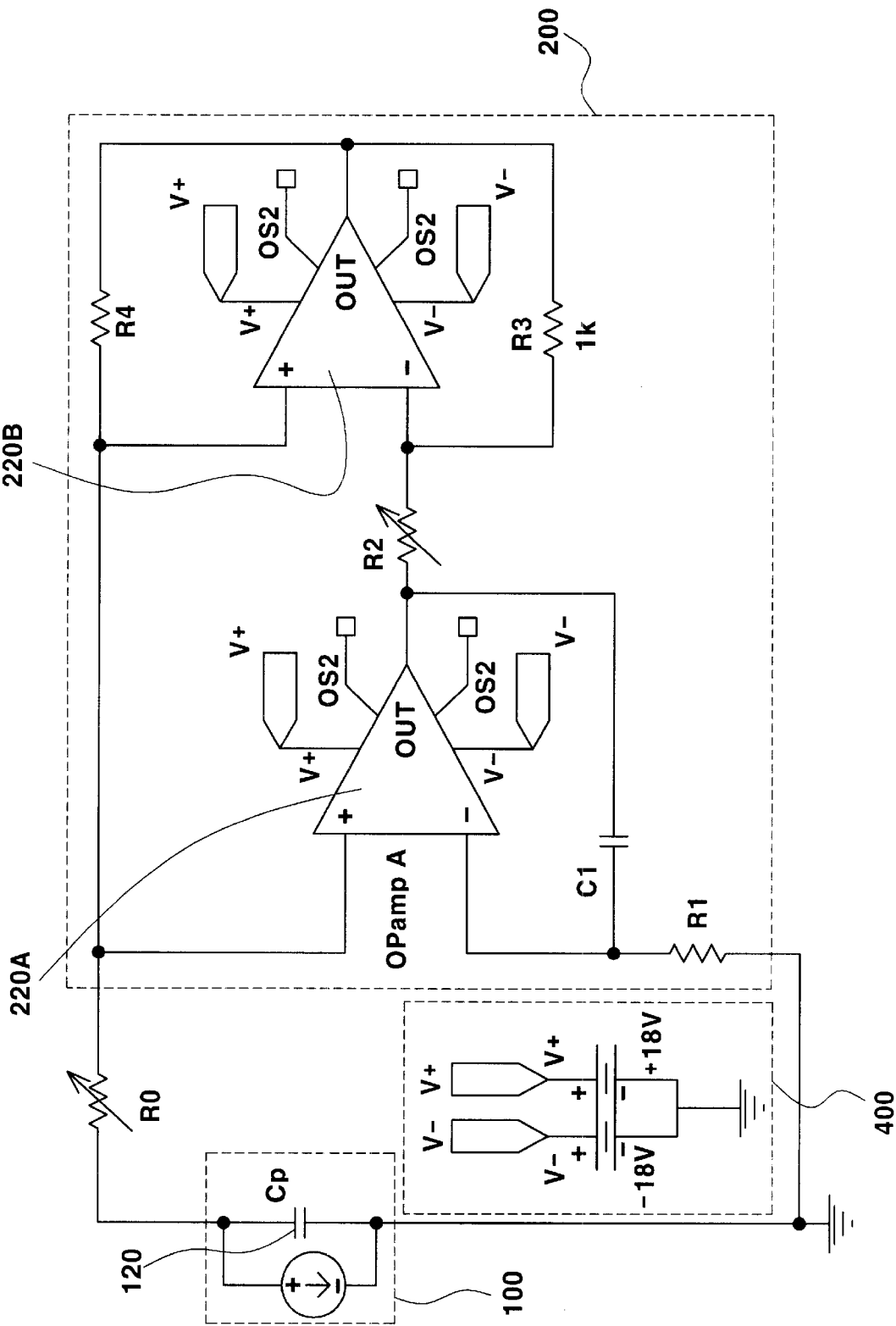
FIG. 1 is a circuit diagram showing the conventional passive shunt circuit.
Figure 2:
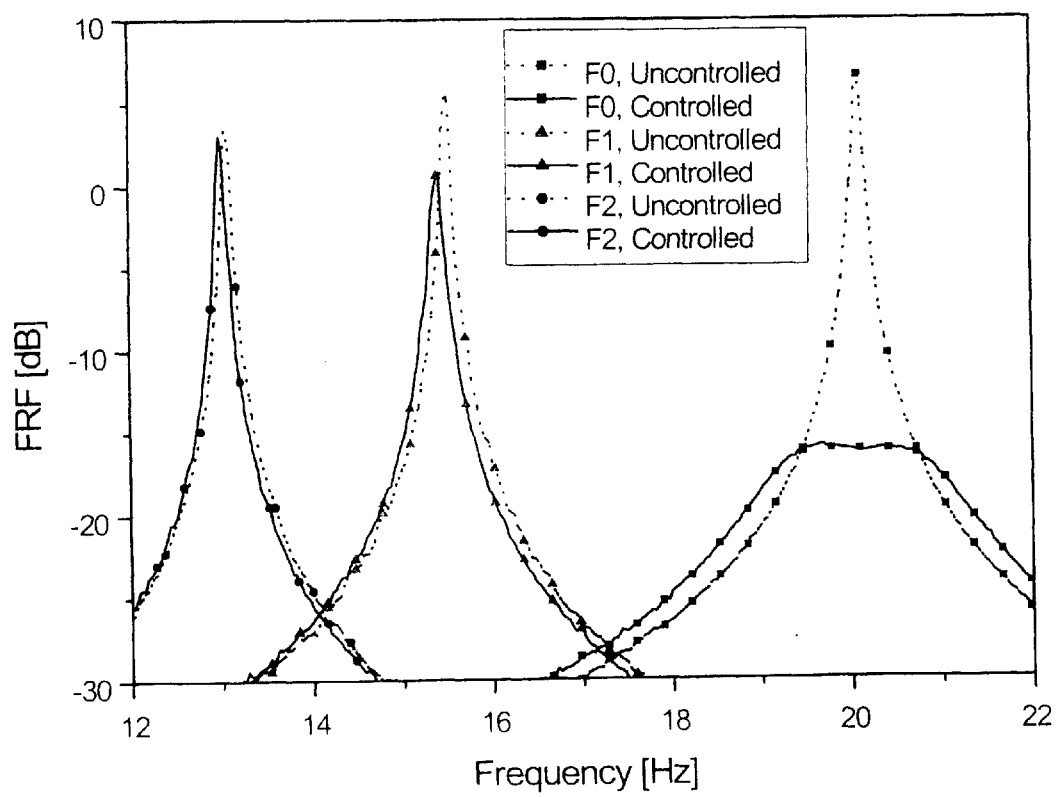
FIG. 2 illustrates the graphs showing the frequency responses showing the vibration control results of the passive shunt of FIG. 1.
Figure 3A:
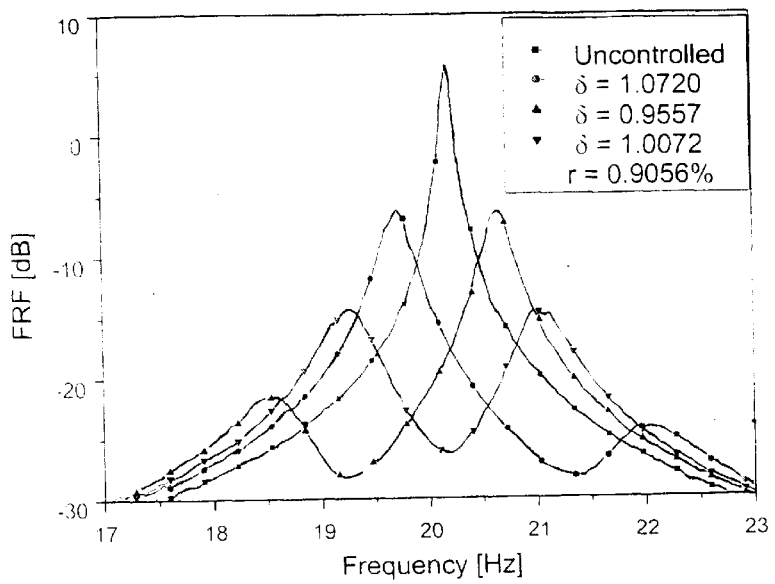
Figure 3B:
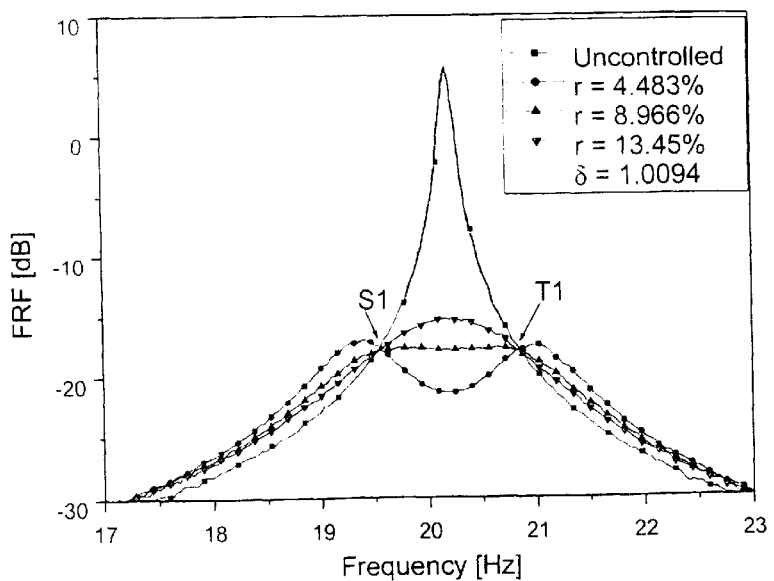
Figure 4A:
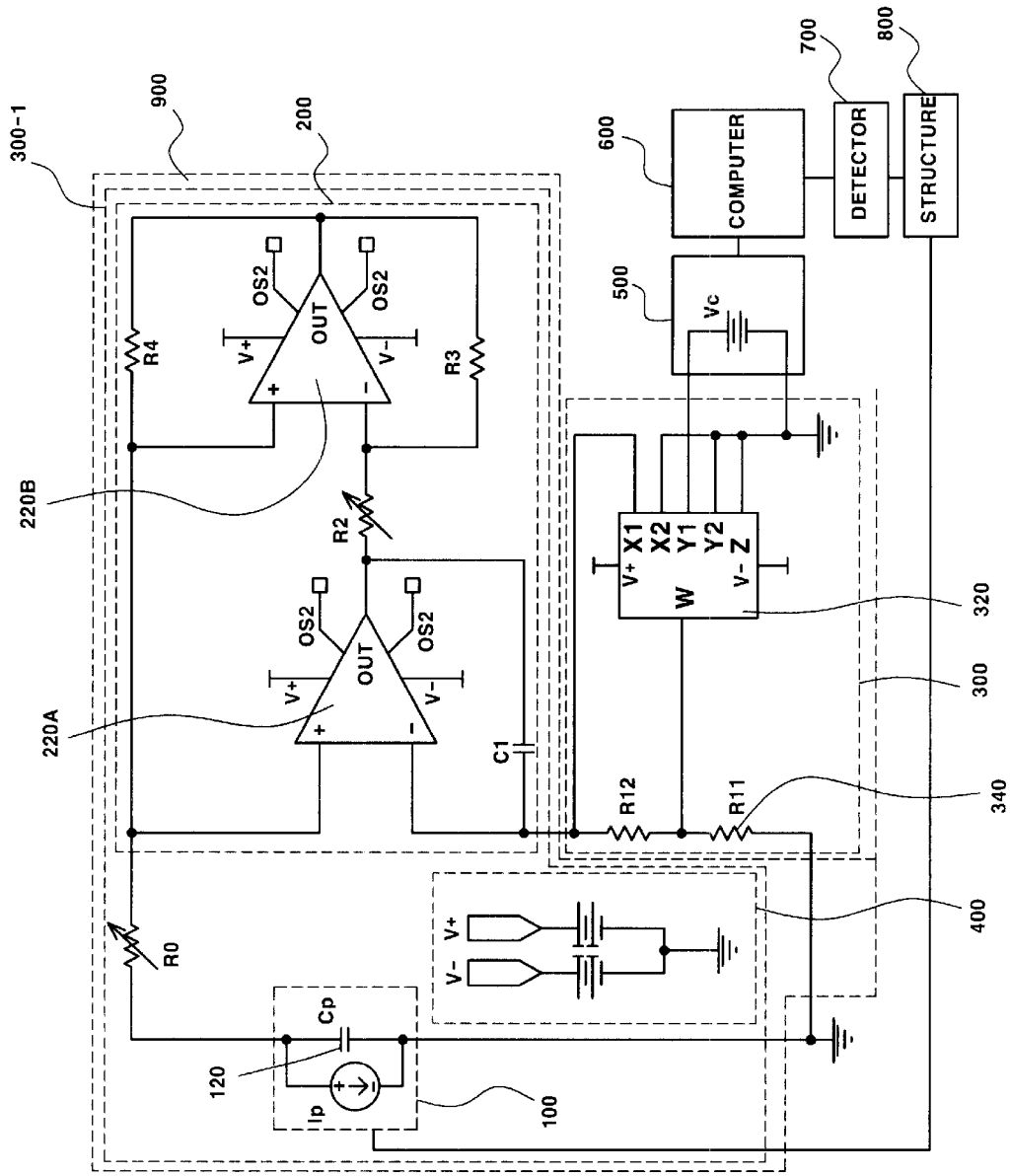
Figure 4B:
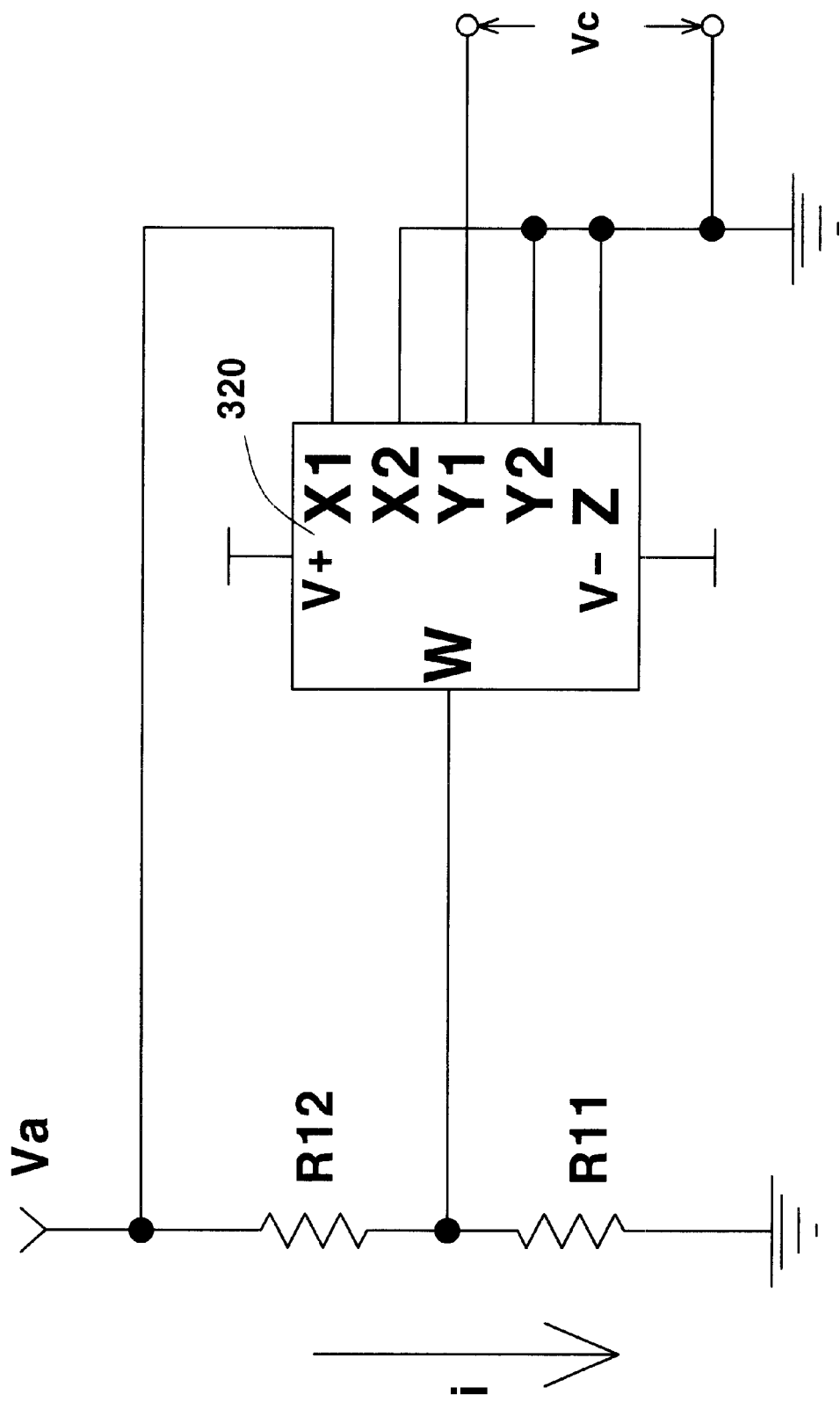
Figure 4C:
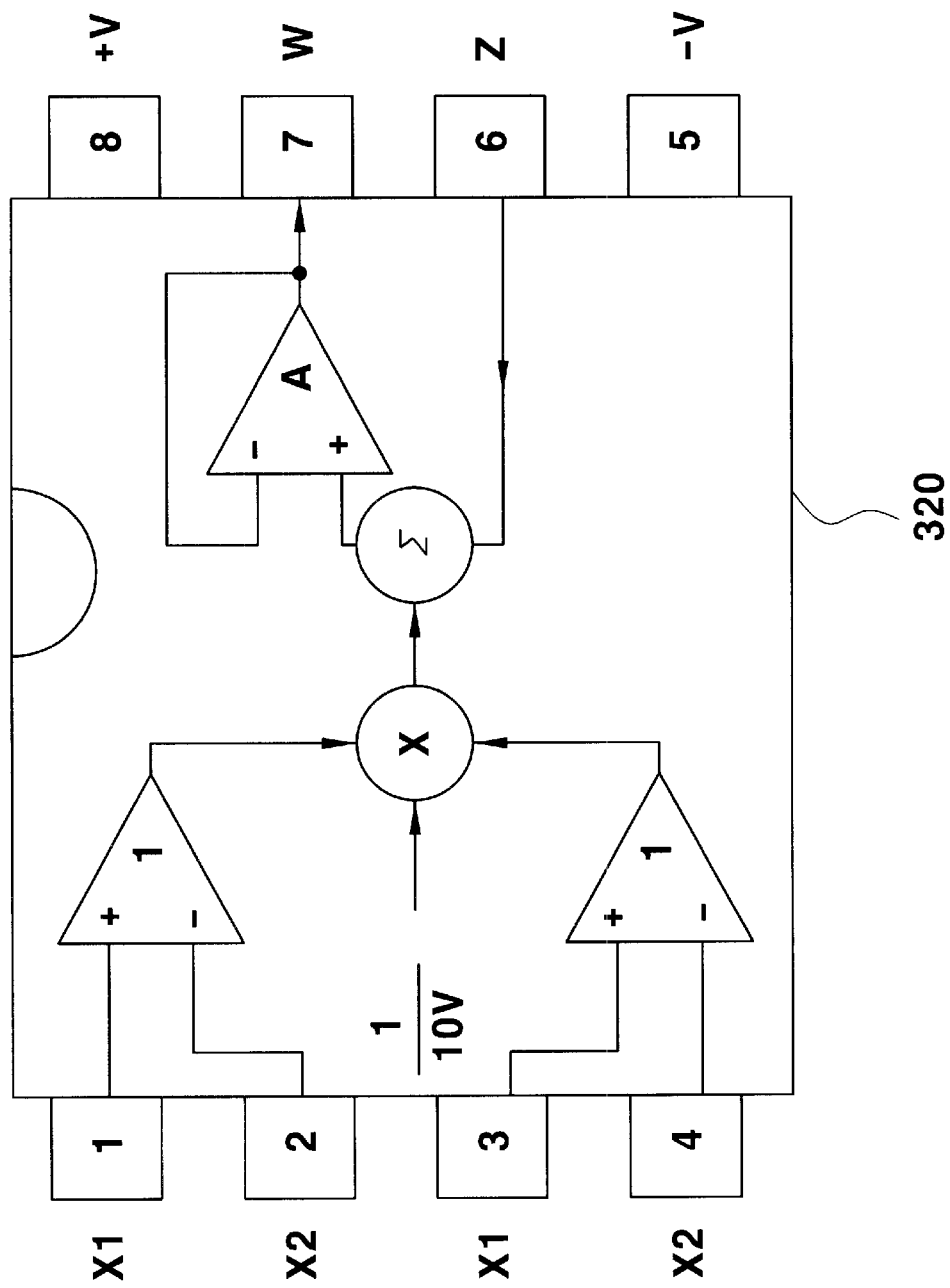
Figure 6:
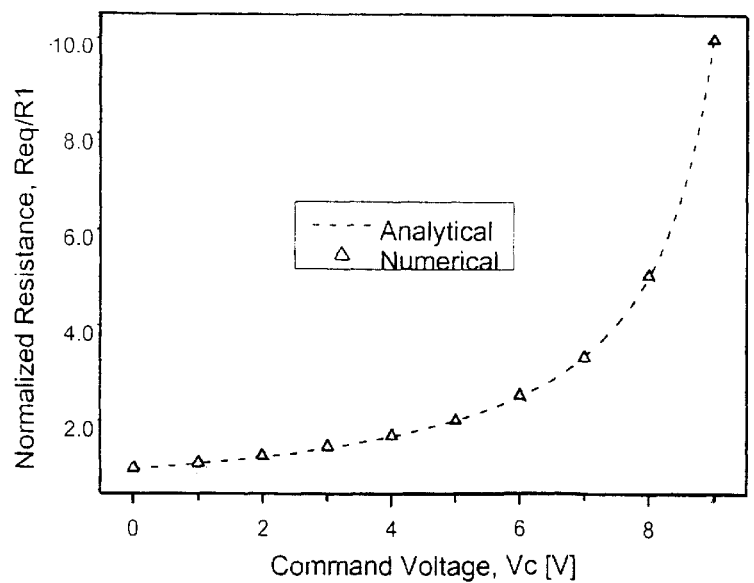
Figure 7A:
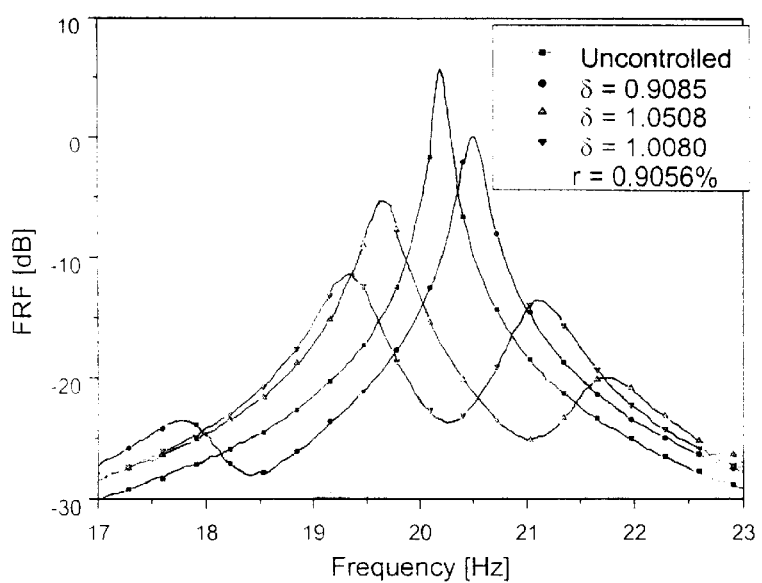
Figure 7B:
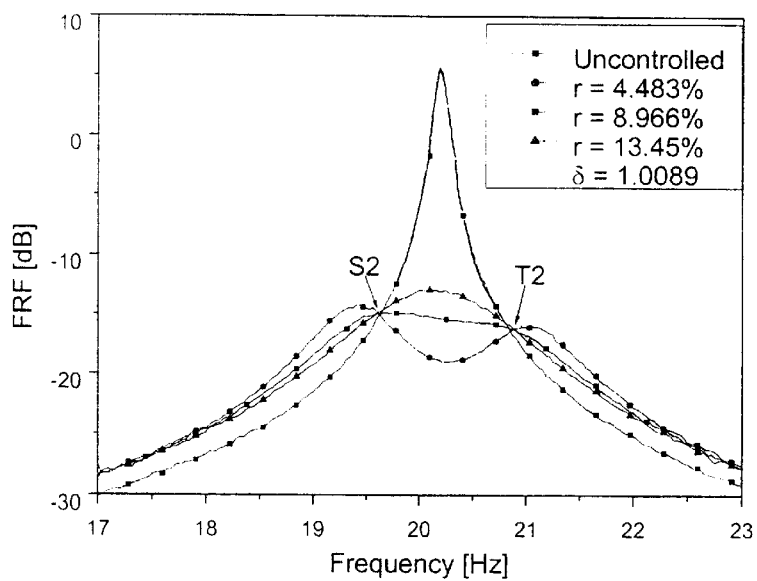
Figure 8:
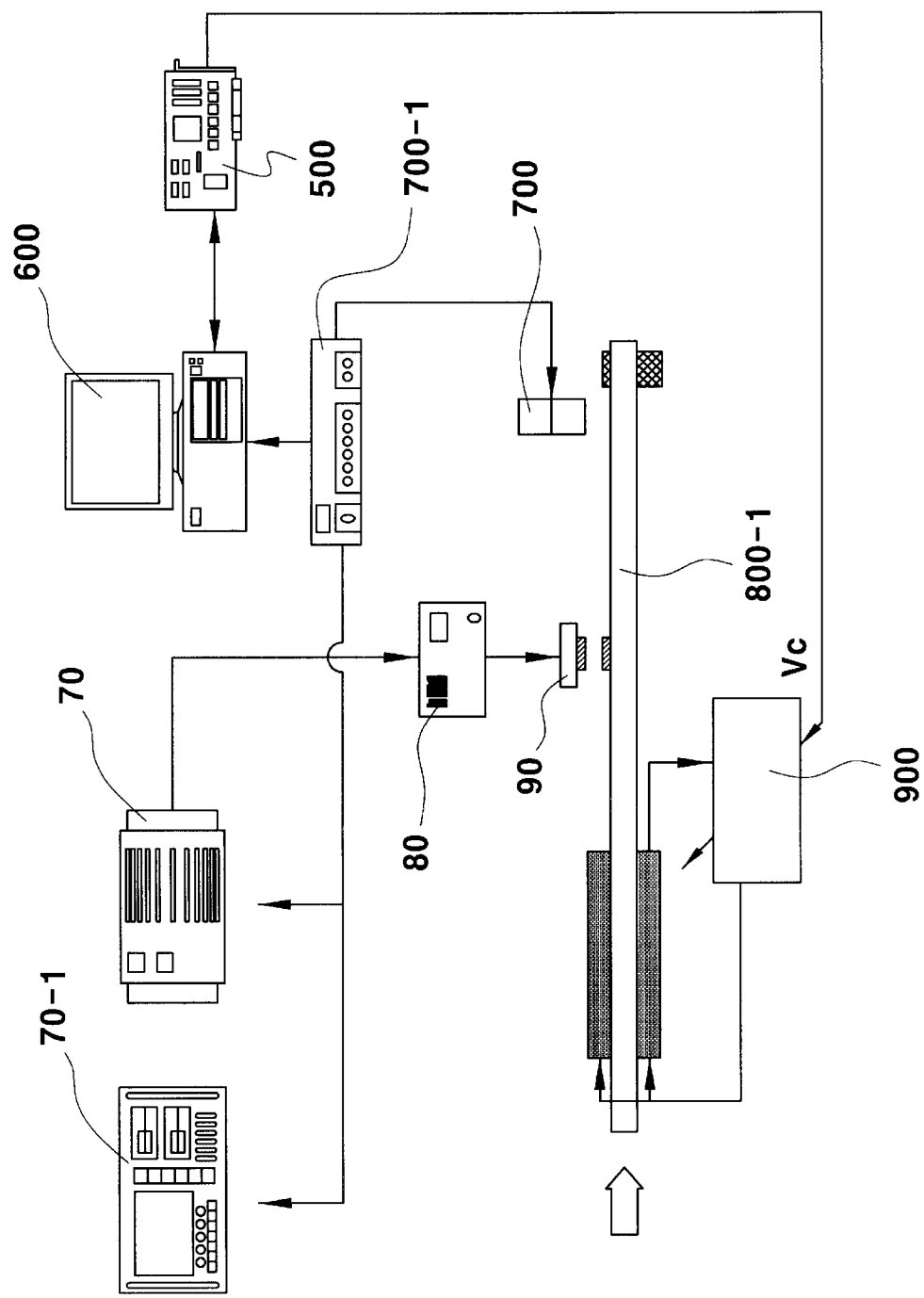
Figure 9A:
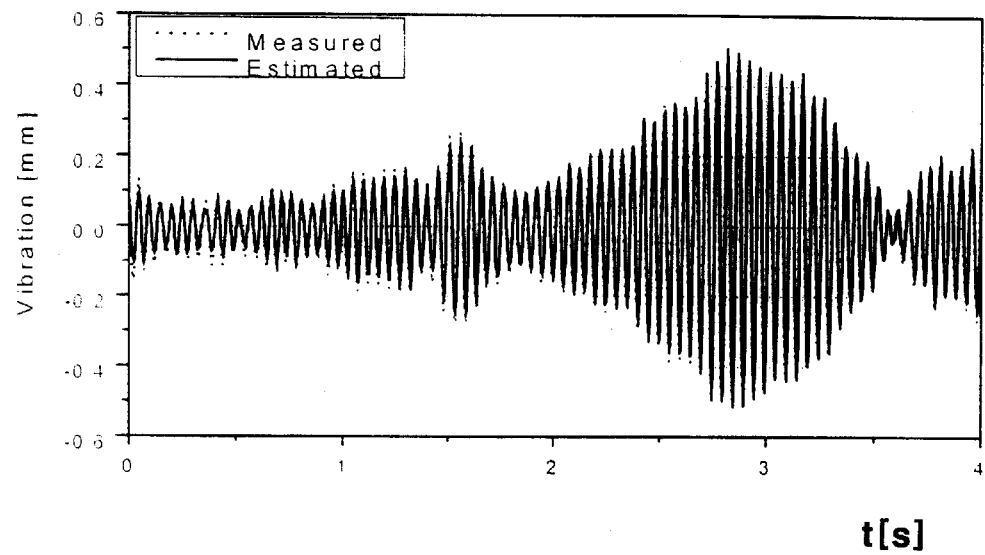
Figure 9B:
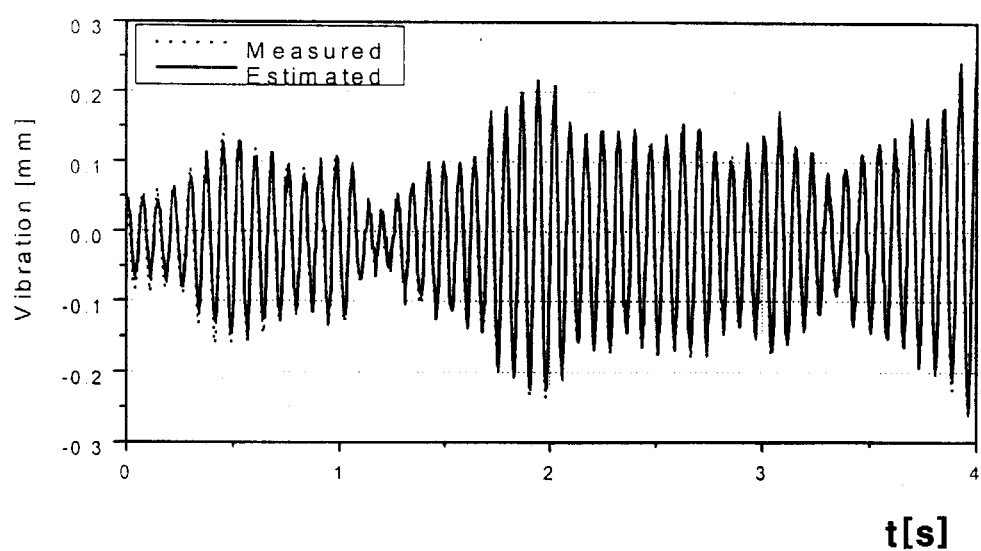
Figure 10:
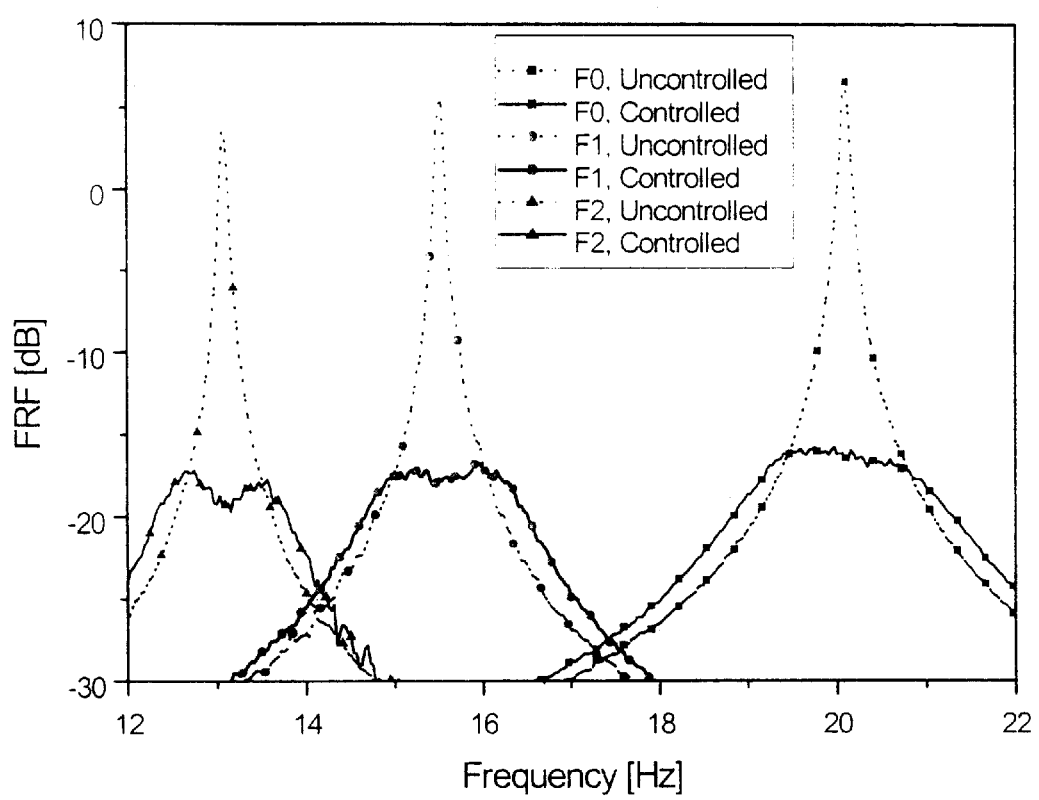

FIG: 3A illustrates the graphs showing the frequency responses showing the time when the center frequency of the passive shunt of FIG. 1 shifts;

FIG. 3B illustrates the graphs showing the frequency responses showing the time when the electrical damping ratio of the passive shunt of FIG. 1 shifts;

FIG. 4A is a circuit diagram showing the constitution of the adaptive shunt for controlling the vibrations of a structure according to the present invention;

FIG. 4B is a circuit diagram showing the equivalent resistance of the frequency-varying unit of FIG. 4A;

FIG. 4C is a pin connection illustration for the IC of FIG. 4A;

FIG: 5 illustrates the frequency responses showing the frequency response of the adaptive shunt of FIG. 4A;

FIG. 6 illustrates the results showing the numerical simulation results with respect to the command voltage of the adaptive shunt of FIG. 4A;

FIG. 7A illustrates the frequency responses showing the time when the electrical center frequency of the adaptive shunt of FIG. 4A is shifted;

FIG. 7B illustrates the frequency responses showing the time when the electrical damping ratio of the adaptive shunt of FIG. 4A is shifted;

FIG. 8 illustrates the constitution of the preferred embodiment of the adaptive shunt for controlling the vibrations of a structure according to the present invention;

FIG. 9A illustrates the time responses showing the measured signals of the adaptive shunt for controlling the vibrations of a structure according to the present invention;

FIG. 9B illustrates the time responses showing the estimated signals of the adaptive shunt for controlling the vibrations of a structure according to the present invention;

FIG. 10 illustrates the frequency responses showing the vibration control results of the adaptive shunt for controlling the vibrations of a structure according to the present invention;

FIG. 11 is a flow chart showing the operating method for the adaptive shunt for controlling the vibrations of a structure according to the present invention.

DETAILED DESCRIPTION OF THE PREFERRED EMBODIMENT

FIG. 4A is an adaptive shunt system to control the vibrations of a structure according to the present invention.

As shown in the drawing, the adaptive shunt system comprises a detector 700 for detecting vibrations generated from a predetermined structure 800 and generating vibration signals corresponding to the vibrations, a computer 600 for inputting the vibration signals from the detector 700, a signal processing unit 500, such as a digital signal processing (DSP) board, for generating a voltage command Vc based on the vibration signals from the computer 600, and an adaptive shunt device 900 for adaptively controlling the vibrations of the structure of which natural frequency varies at every moment according to the voltage command Vc.

Here, the adaptive shunt circuit unit 900 comprises a mechanical-to-electrical conversion unit 100, which is contacted to the structure, for controlling the vibrations of the structure 800, an inductance unit 200 for controlling the vibrations of the structure, which is serially connected to the mechanical-to-electrical conversion unit 100, and a frequency-varying unit 300, connected to the inductance unit 200, for changing a equivalence resistance for varying the electrical center frequency, according to the varying signal outputted from the signal processing unit 500. In addition, the adaptive shunt circuit 900 comprises a variable resistor R0 between the mechanical-to-electrical conversion unit 100 and the inductance unit 200. The inductance unit 200 includes two operation-amplifiers 220A and 220B and functions as a synthetic inductor. The mechanical-to-electrical conversion unit 100 such as a piezoelectric device functions a capacitor 120.

Therefore, the close loop formed in the adaptive shunt circuit unit 900 is operated like a R-L-C circuit, which is the same as the passive shunt circuit 300-1.

The frequency-varying unit 300, as shown in FIGS. 4B and 4C, comprises two resistors R11 and R12 connected to the inductance unit 200, and a multiplier 320 inputting the voltage command and output a control signal a node between the two resistors R11 and R12.

FIG. 4B is a circuit diagram showing the equivalent resistance of the frequency-varying unit of FIG. 4A. FIG. 4C is a pin connection illustration for the IC of FIG. 4A.

As shown in FIGS. 4B and 4C, the IC 320 of the frequency-varying unit 300 is a multiplier, for example JN Type AD633, to change the equivalent resistance which allow the circuit to vary the electrical center frequency.

If an equivalent resistance is formed by using the multiplier IC 320, then the equivalent resistance, Req is changed in accordance with the externally supplied command voltage based on the following equation (1):

$$R_{eq} = R_1(1 - 0.1 V_c) \tag{1}$$

Accordingly, if the equivalent resistance in which the equivalent resistance is varied along with the command voltage is connected to the conventional passive shunt, then the electrical center frequency can be varied based on the following equation (2):

$$\omega = \frac{1}{\sqrt{c_p L_{eq}}} = \sqrt{\frac{R_1/(1 - 0.1 V_c)}{c_p R_2 C_1 R_1}} \tag{2}$$

The operation of the adaptive shunt system of the present invention will be explained referring to drawings as below:

When the vibration frequencies of a structure 800 are detected by the detector 700 and inputted into the signal processing unit 500 via the computer 600, the signal processing unit 500 estimates a frequency in real-time using an adaptive algorithm according to the present invention. Then, a corresponding command voltage Vc, which is calculated in the signal processing unit 500 based on the estimated frequency is supplied to the adaptive shunt circuit 900.

That is, a center frequency of the structure 800 is adjusted along to the vibration frequencies estimated in the signal processing unit 500 in real-time, thereby providing adaptability to the circuit.

Figure 5:
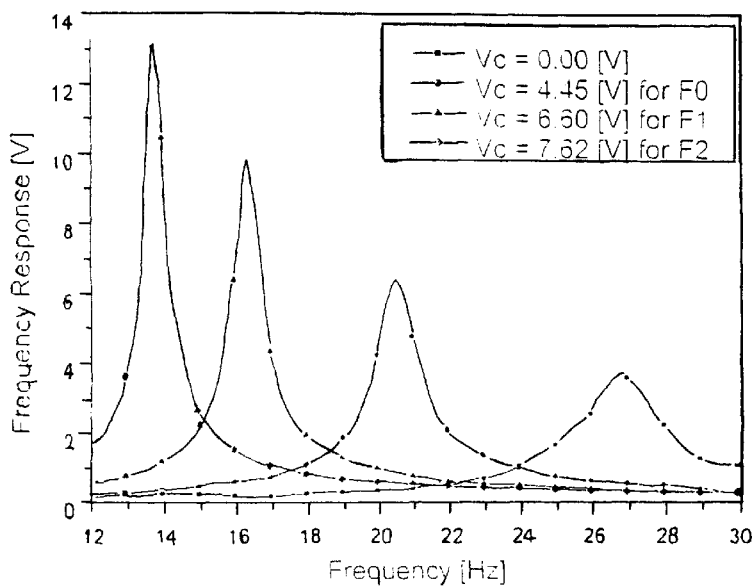

FIG. 5 illustrates the frequency response of the adaptive shunt circuit of FIG. 4A with PSPICE which simulates electric circuits. That is, if the command voltage is varied of the adaptive shunt circuit 900, then the electrical center frequency and the electrical damping ratio are varied.

FIG. 6 illustrates the equivalent resistance along with the command voltage of the adaptive shunt, which shows the validity of the equation (1).

Changing the command voltage, Vc, shifts the electrical center frequency of the adaptive shunt circuit of FIG. 4A, and results in the frequency responses of FIG. 7A.

FIG. 7B illustrates graphs showing the frequency responses when the electrical damping ratio of the adaptive shunt of FIG. 4A is shifted by changing the variable resistance, R0.

In FIGS. 7A and 7B, there are illustrated the adjustment characteristics of the adaptive shunt circuit 900 for controlling the vibrations of the structure 800.

As predicted theoretically and through the numerical simulations, it can be seen that the electrical center frequency and the electrical damping ratio have been shifted in accordance with the variation of the command voltage.

For this numerical simulations, the preferred embodiment of the adaptive shunt system according to the present invention can be configured as shown in FIG. 8.

The vibration frequency is estimated by means of the vibration signals of the structure in the signal processing unit 500 in real-time. Command voltages, Vc, which are calculated by utilizing the estimated vibration frequency, are supplied to the adaptive shunt circuit 900 at every time, and thus, an electrical center frequency is changed along to the vibration frequencies of the structure 800-1. Namely, as shown in FIG. 8, a laser sensor 700 measures the vibration signals from the structure 800-1 to estimate the natural frequency of the structure 800-1 with an adaptive algorithm within the signal processing unit 500. Then the command voltage Vc is supplied to the adaptive shunt circuit 900, and thus, the vibrations are suppressed while adapting to the frequency variation of the structure 800-1.

Here, the natural frequency ω is estimated on a real time basis by utilizing the adaptive algorithm, and then, the command voltage Vc is calculated based on the following equation (3):

$$V_c = 10[1 - R_0 C_1 R_2 C_p (\delta \cdot \omega^1)^2] \quad (3)$$

where δ is the normalized tuning ratio for the electrical center frequency and the vibration frequencies of the structure. This value is usually tuned around 1.0.

The vibration signals which have been measured by the laser sensor 700 are processed as follows. The characteristic equation for the structure 800-1 are estimated using the RLS(Recursive Least Square) method, and then, the Bairstow method is used to factorize the characteristic equation into the each mode. Then, the vibration frequencies are obtained based on the respective characteristic equations. That is, the vibration signals measured at a frequency analyzer (FFT Anlayzer) 70 are supplied through a voltage amplifier 80 to an electromagnet 90 to excite a test specimen. Then the control and the uncontrolled responses are compared to observe the vibration control performance.

Command voltages calculated by the equation (3) are supplied to the adaptive shunt circuit 900 at each time step.

FIGS. 9A and 9B illustrates the time responses showing the estimated signal well correspond to the measured signal. From this result and the other experimental results omitted here show the estimation performance can be thought of accurate.

In FIG. 10, the natural frequency of the structure changes from the F0 to F2 cases, the adaptive shunt system consistently control the vibration around 20 dB.

FIG. 11 is a flow chart showing the vibration control method of the adaptive shunt system according to the present invention.

First, when the detector such as a laser detects vibrations from a predetermined structure and transmits the vibration signals to the computer in step S1, the signal processing unit estimates a target model based on the inputted vibrations signal via computer using the Recursive Least Squares(RLS) method in step S2.

Then, the vibration frequencies are calculated with the target model using the Bairstow method in step S3.

If the vibration frequencies are converged to real frequencies of the structure in step S4, then the signal processing unit adjusts the command voltage using equation (3) and outputs to the adaptive shunt circuit in steps S5 and S6.

Therefore, the adaptive shunt circuit is controlling the vibrations from the structure as the vibration perceived with the detector in step S7.

However, if the center frequency is not exactly match with the vibration frequency, then the performance is degraded. The command voltages calculated in the signal processing unit in steps from S2 to S4, adaptively tunes the shunt circuit. Namely, the vibration frequency is estimated in the signal processing unit, and command voltages calculated by the estimated vibration frequency is supplied to the adaptive shunt circuit at every moment.

Therefore, the adaptive shunt of the present invention is capable of coping with the variations of the vibration frequencies to carry out an adaptive vibration control.

What is claimed is:

1. An adaptive shunt system for controlling vibrations of a frequency-varying structure, the system comprising:
    a detector (700) for detecting vibrations generated from a predetermined structure and generating vibration signals corresponding to the vibrations;
    a computer (600) for inputting the vibrations signals from the detector;
    a signal processing unit (500) for processing the vibration signals from the computer and generating a voltage command in real-time; and
    an adaptive shunt device (900) for adaptively controlling the vibrations of the structure of which natural frequency varies at every moment according to the voltage command.

2. The adaptive shunt system according to claim 1, wherein said detector comprising a laser.

3. The adaptive shunt system according to claim 1, wherein said signal processing unit comprising a digital signal processing (DSP) board.

4. The adaptive shunt system according to claim 1, wherein said adaptive shunt device comprising:
    a frequency-varying unit for varying a voltage potential of its output terminal according to the voltage command so as to adaptively control the vibrations of the structure of which natural frequency varies at every moment; and
    a passive shunt circuit unit for controlling the vibrations of the structure according to the output signals from the frequency-varying unit.

5. The adaptive shunt system according to claim 4, wherein said frequency-varying unit comprising an IC.

6. The adaptive shunt system according to claim 4, wherein said frequency-varying unit comprising a multiplier.

7. The adaptive shunt system according to claim 4, wherein said passive shut circuit unit comprising:
    a mechanical-to-electrical conversion unit for controlling the vibrations of the structure, the mechanical-to-electrical conversion unit contacted to the structure,
    an inductance unit (200) for varying its inductance according to the varying signal outputted from the frequency-varying unit; and a resistor between the mechanical-to-electrical conversion unit and the inductance unit.

8. The adaptive shunt system according to claim 7, wherein said mechanical-to-electrical conversion unit has a capacitance.

9. The adaptive shunt system according to claim 7, wherein said mechanical-to-electrical conversion unit comprising a piezoelectric device.

10. The adaptive shunt system according to claim 4, wherein said passive shut circuit unit forms a R-L-C circuit.

11. The adaptive shunt system according to claim 10, wherein said mechanical-to-electrical conversion unit functions a capacitor.

12. A vibration controlling method of a structure which varies its natural frequency, the method comprising the steps of:

detecting vibrations generated from the structure;

estimating a target model based on the detected vibrations;

calculating vibration frequencies based on the estimated target model;

adjusting a command voltage if the vibration frequencies converge to real frequencies of the structure; and controlling the vibrations of the structure according to the command voltage.

13. The vibration controlling method according to claim 12 further performing, if the vibration frequencies do not converge to real frequencies of the structure, the steps of:

estimating another target model based on the detected vibrations; and calculating vibration frequencies based on the estimated target model.

14. The vibration controlling method according to claim 12, wherein said estimating step is performed by Recursive Least Squares means.

15. The vibration controlling method according to claim 12, wherein said calculating step is performed by Bairstow calculating means.

* * * * *